United States Patent
Palonis et al.

(10) Patent No.: US 6,432,010 B1
(45) Date of Patent: Aug. 13, 2002

(54) DYNAMIC TRACK TENSION ADJUSTER

(75) Inventors: Patrick J. Palonis, Warren; James A. Capouellez, Sterling Heights, both of MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/694,632

(22) Filed: Oct. 23, 2000

(51) Int. Cl.[7] .................................................. F16H 7/08
(52) U.S. Cl. ........................ 474/101; 305/144; 305/154; 188/322.19
(58) Field of Search .............................. 474/101, 109, 474/110, 114, 115, 116, 117, 136, 900, 901; 74/89.23, 89.25, 89.26, 89.45; 305/154, 144, 145, 148; 475/4, 149; 280/149.2; 180/209, 906

(56) References Cited

U.S. PATENT DOCUMENTS

| | | | | |
|---|---|---|---|---|
| 2,403,092 A | * | 7/1946 | Lear | 74/89.26 |
| 2,713,810 A | * | 7/1955 | Hill | 74/89.35 |
| 2,918,786 A | * | 12/1959 | Geyer | 74/89.25 |
| 2,940,784 A | * | 6/1960 | Fell | 74/89.35 |
| 4,265,142 A | * | 5/1981 | Watanabe | 74/625 |
| 4,949,941 A | * | 8/1990 | Bauer et al. | 267/64.12 |
| 6,024,183 A | * | 2/2000 | Dietz et al. | 180/9.1 |

FOREIGN PATENT DOCUMENTS

JP 1-135952 * 5/1989 ............. F16H/7/12

* cited by examiner

Primary Examiner—Thomas R. Hannon
Assistant Examiner—Timothy McAnulty
(74) Attorney, Agent, or Firm—David L. Kuhn; Clifford C. Soderling

(57) ABSTRACT

A dynamic track tension adjuster is connected between the body of a tracked vehicle and an arm-like axle member of the vehicle. The adjuster swings the arm-like member so that a wheel on the axle member engages the vehicle's track with differing force. The adjuster includes a cylinder with two pistons extending therefrom and a compressible fluid between the pistons. A motor fixed to the cylinder drives a gear train that includes a transfer gear connected to one of the pistons. A shaft co-axially fixed to the transfer gear threads with a rod such that the rod translates when the shaft rotates. Translation of the rod swings the axle member.

6 Claims, 2 Drawing Sheets

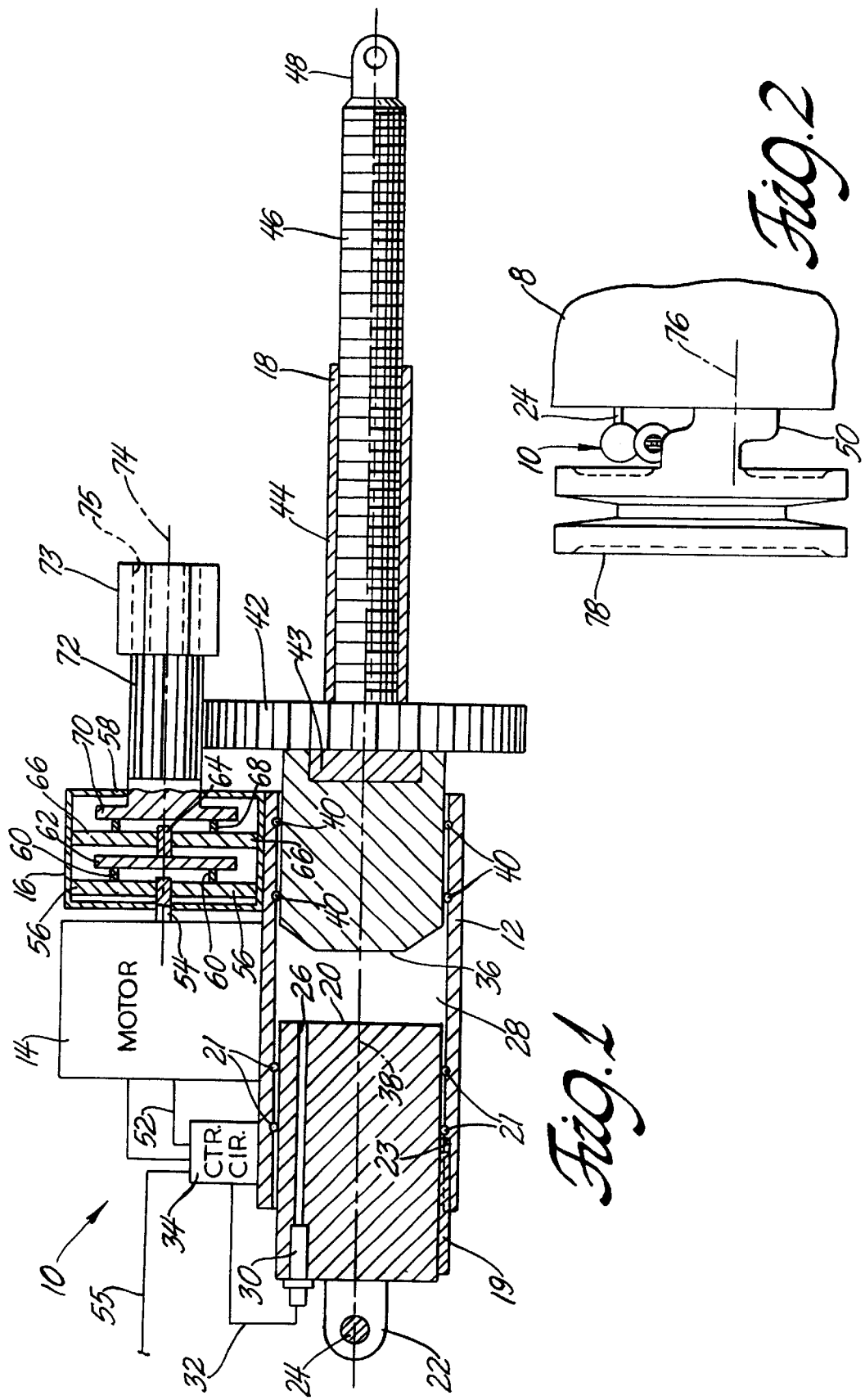

DYNAMIC TRACK TENSION ADJUSTER

GOVERNMENT USE

The invention described here may be made, used and licensed by the or for the U.S. Government for governmental purposes without paying us any royalty.

BACKGROUND

The tracks on vehicles such as tanks need to be properly tensioned in order to operate most effectively and operate without excess maintenance. Track tension is typically controlled by moving a sprocket or idler wheel that engages the track, whereby the track is stretched or allowed to contract. A conventional mechanism for moving the sprocket or idler wheel is a track tensioner comprising a grease-filled cylinder. A piston in the cylinder moves as grease is added or removed through a fitting. The piston's motion is transferred to the sprocket or idler wheel. One disadvantage with such a track tensioner is that a grease gun and grease must be at hand whenever the track needs tension adjustment. Also, such a track tensioner requires that personnel be outside the vehicle to use it. This is a problem, for example, when the vehicle is a tank in the forward area of an active combat zone. In addition, when the vehicle leaves one kind of terrain and enters another, it is often not practical to adjust track tension to a level preferred for the new terrain. Consequently, track tension is often set at the highest level that the vehicle might need, and this level is maintained even on terrain that does not require it. The unnecessary periods of high tension unduly accelerate track wear.

SUMMARY

We address the foregoing concerns with our track tensioner, which is dynamic in that it adjusts tension of a moving track during vehicle travel. Our tensioner has a power screw that moves the vehicle's sprocket or idler wheel to tighten or loosen the track. Connected to the power screw rod is a shock absorber comprising a cylinder closed at one end by a piston to contain a compressible fluid, the shock absorber moderating spikes in track tension. The power screw acts automatically to equalize actual track tension with desired track tension. Actual tension is determined by measuring fluid pressure in the cylinder whereas desired tension is selected by a person in the vehicle via a control circuit.

BRIEF DESCRIPTION OF THE DRAWINGS

FIG. 1 is a partly sectioned view of our dynamic track tension adjuster

FIGS. 2 and 3 show our track tension adjuster installed on a tracked vehicle.

DETAILED DESCRIPTION

Figure 3:
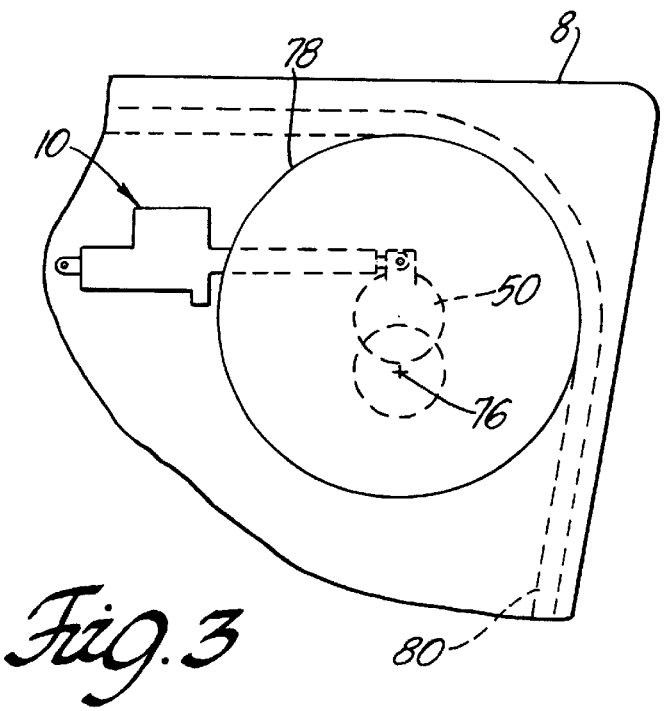

FIG. 1 shows our tension adjuster 10 having a cylinder 12, motor 14, a double reduction planetary gear set 16 and a power screw 18. Protruding from cylinder 12 is a first piston 20, which slides against ring seals 21 as it translates relative to cylinder 12. Piston 22 preferably has one or more splines 19 engaging complementary key ways 23 defined in cylinder 12 so that the cylinder, motor and gear set do not rotate on the piston. The piston's eye 22 engages a pin 24 fixed to a vehicle body element 8 (FIG. 2), and adjuster 10 turns slightly about pin 24. A duct 26 in piston 20 communicates compressible fluid 28 with pressure sensor 30. This sensor sends signals, which are a function of track tension, through line 32 to control box 34. Preferably fluid 28 is one of the relatively compressible liquids developed in recent years as opposed to the essentially uncompressible liquids used in the past. The maximum compression of the preferred liquid is typically about 10%, such that the liquid will function as a shock absorber for adjuster 10. Alternatively, fluid 28 may be a gas or a combination of gas and liquid.

Opposing first piston 20 is a second piston 36 normally protruding partly from cylinder 12, both pistons and the cylinder being centered on axis 38. Piston 36 is preferably fixed relative to cylinder 12 when adjuster 10 operates. The in-operation fixed relation of piston 36 can be achieved, for example, by tightness of fit between the piston and ring seals 40. During repair of adjuster 10, however, piston 36 can be extracted completely from cylinder 12.

Rotatably mounted to piston 36 via bearing connection 43 is transfer gear 42, which is fixed to the power screw's internally threaded shaft 44. Rotating transfer gear 42 and shaft 44 translates the power screw's threaded rod 46 toward or away from the transfer gear, thereby shortening or lengthening adjuster 10. Rod 46 has an eye 48, which serves as an attachment point for connecting tension adjuster 10 to an arm-like axle element 50 shown in FIGS. 2 and 3.

As an alternative to bearing connection 43, piston 36 may itself rotate relative to cylinder 12 during operation of adjuster 10. In this case, transfer gear 44 is fixed to piston 36. Another option is to allow piston 36 to translate relative to the cylinder during the adjuster's operation, in which case the teeth of output shaft 72 will be elongate to accommodate translation of transfer gear 42 with piston 36.

A DC motor 14 affixed to cylinder 12 powers adjuster 10. The motor starts, stops or reverses in response to signals over line 52 from control circuit 34. This circuit in turn responds both to input signals sent through line 55 and to pressure indication signals sent from sensor 30 over line 32. The motor's output shaft 54 drives a first set of orbiting gears 56 that roll on a first toothed portion of the inner surface of gear housing 58. Gears 56 spin first stub shafts 60 about axis 74, thereby rotating first plate 62 and mediate shaft 64 extending therefrom. Shaft 64 is toothed so as to drive a second set of orbiting gears 66 that roll on a second toothed portion of the inner surface of housing 58. Gears 66 spin second stub shafts 68 about axis 74, thereby rotating second plate 70 and output shaft 72. Shaft 72 has teeth that maintain meshing contact with transfer gear 42. Fixed to shaft 72 is drive head 73 having a hexagonal external shape and a hexagonal well 75, so that shaft 72 can be turned by tools such as a box wrench or Allen wrench for manual operation of adjuster 10.

When it is desired to modify tension in a vehicle track, an appropriate input signal is sent by a human operator over line 55 to control circuit 34, which commands motor 14 to start. Rotary motion of motor 14 is transferred through planetary gear set 16 to output shaft 72, then to transfer gear 42 and finally to internally threaded shaft 44. Rotation of shaft 44 translates threaded rod 46 and swings axle element 50 on axis 76, thereby swinging idler wheel 78 about the same axis. The swing of wheel 78 either increases or decreases the tension on track 80, which is represented schematically by dashed lines in FIG. 3. When the desired track tension is achieved, sensor 30 will detect a corresponding pressure of fluid 28 in cylinder 12 and the sensor will send a signal to control circuit 34, which will then stop motor 14. Sudden, temporary increases in track tension occur as track 80 runs over terrain irregularities. These increases will send a shock along rod 46 that ultimately transfers to fluid 28, whereupon the compressibility of fluid 28 causes it to absorb a portion of such a shock.

Figure 4:
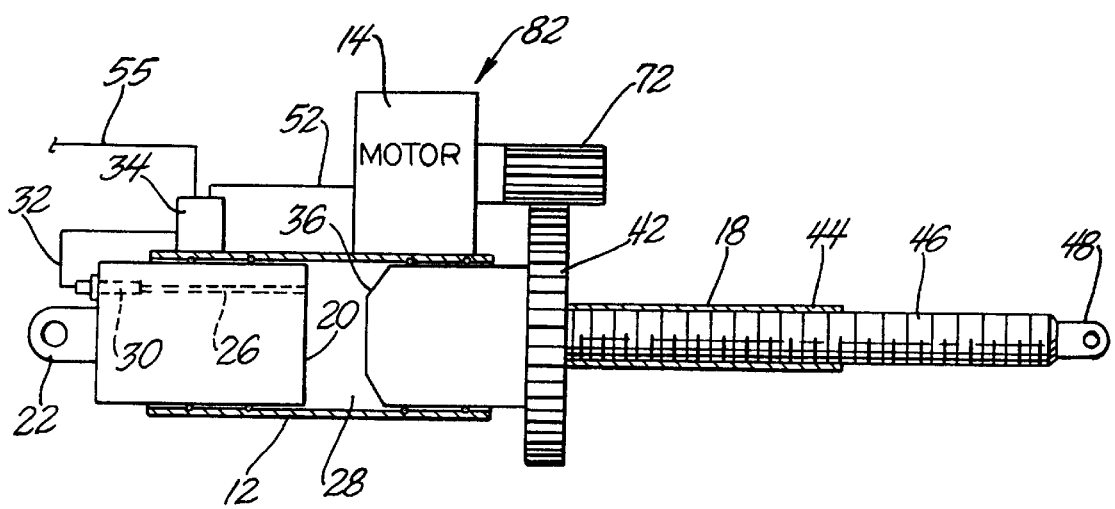
FIG. 4 is an alternate embodiment of the track tensioner shown in FIG. 1.

FIG. 4 shows a second embodiment 82 of our track tensioner. The principle change of the second embodiment is that planetary gear set 16 is eliminated so that motor 14 drives shaft 72 directly. In addition, transfer gear 42 is fixed to piston 36, which rotates and translates relative to cylinder 12.

We wish it to be understood that we do not desire to be limited to the exact details of construction or method shown herein since obvious modifications will occur to those skilled in the relevant arts without departing from the spirit and scope of the following claims.

We claim:

1. A mechanism to adjust tension in a track of a vehicle having a body element, an axle element and a track engaging wheel mounted on the axle element, the mechanism comprising:
    a cylinder;
    a compressible fluid in the cylinder;
    a piston contacting the liquid and translatable with respect to the cylinder;
    a first elongate member;
    a second elongate member translatable relative to the first member;
    a transfer gear fixed to the first member;
    means for rotating transfer gear;
    means to control the rotating means in response to actual track tension and desired track tension;
    means for connecting the cylinder to one of the elements; and
    means for connecting the second member to another of the elements.

2. The mechanism of claim 1 wherein the piston is a first piston and the mechanism further comprises:
    a second piston in the cylinder axially aligned with the first piston and contacting the fluid; and
    means for connecting the transfer gear to the second piston.

3. The mechanism of claim 2 further comprising means to immobilize the second piston relative to the cylinder during actuation of the rotating means.

4. The mechanism of claim 2 wherein the transfer gear is translatable and rotatable relative to the cylinder.

5. A mechanism to dynamically adjust tension in a track of a land vehicle having a body element, an axle element and a track engaging wheel mounted on the axle element, the mechanism comprising:
    a cylinder;
    a piston translatable and rotatable with respect to the cylinder;
    a compressible fluid in the cylinder comprised at least partially of a liquid;
    a motor on the cylinder;
    a transfer gear fixed to the piston;
    means for transferring rotary motion from the motor to the transfer gear;
    a threaded shaft fixed to the transfer gear;
    a rod threaded with the shaft, the shaft rotatable relative to the rod, whereby the rod is translatable relative to the shaft;
    means for controlling the motor;
    means for sensing pressure of the compressible fluid, the sensing means communicated to the controlling means;
    means for pivotally connecting the cylinder to one of the elements; and
    means for pivotally connecting the rod to another of the elements.

6. The mechanism of claim 5 herein the compressible fluid is completely a liquid.

\* \* \* \* \*